(12) United States Patent
Hasegawa et al.

(10) Patent No.: US 12,075,383 B2
(45) Date of Patent: Aug. 27, 2024

(54) CONTROL DEVICE, STORAGE MEDIUM, AND COMMUNICATION SYSTEM

(71) Applicant: KABUSHIKI KAISHA TOKAI RIKA DENKI SEISAKUSHO, Aichi (JP)

(72) Inventors: Yosuke Hasegawa, Aichi (JP); Masateru Furuta, Aichi (JP); Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 401 days.

(21) Appl. No.: 17/544,296

(22) Filed: Dec. 7, 2021

(65) Prior Publication Data

US 2022/0256494 A1    Aug. 11, 2022

(30) Foreign Application Priority Data

Feb. 9, 2021   (JP) .................. 2021-019052

(51) Int. Cl.
  *H04W 4/80* (2018.01)
  *H04L 5/00* (2006.01)
  *H04W 64/00* (2009.01)

(52) U.S. Cl.
  CPC ......... *H04W 64/003* (2013.01); *H04L 5/0055* (2013.01); *H04W 4/80* (2018.02)

(58) Field of Classification Search
  CPC ...... H04W 64/003; H04W 4/80; H04L 5/0055
  See application file for complete search history.

(56) References Cited

U.S. PATENT DOCUMENTS 9,566,945 B2 *  2/2017  Ghabra ............... B60R 25/30
2020/0254968 A1 * 8/2020  Hassani ............. H04B 17/318

FOREIGN PATENT DOCUMENTS

CN    114205884 A  *  3/2022  ............ H04W 12/03

* cited by examiner

*Primary Examiner* — Ahmad F. Matar
*Assistant Examiner* — Jirapon Tulop
(74) *Attorney, Agent, or Firm* — GREENBLUM & BERNSTEIN, P.L.C.

(57) ABSTRACT

An object of the present invention is to provide a new and improved technology capable of improving the accuracy of processing in accordance with distance measurement results between each of at least two communication devices and a terminal. Provided is a control device including: an information acquisition unit configured to acquire first information associating a first distance measurement result between a terminal and a first communication device and first identification information of the first communication device, from the first communication device, and to acquire second information associating a second distance measurement result between the terminal and a second communication device and second identification information of the second communication device, from the second communication device.

13 Claims, 3 Drawing Sheets

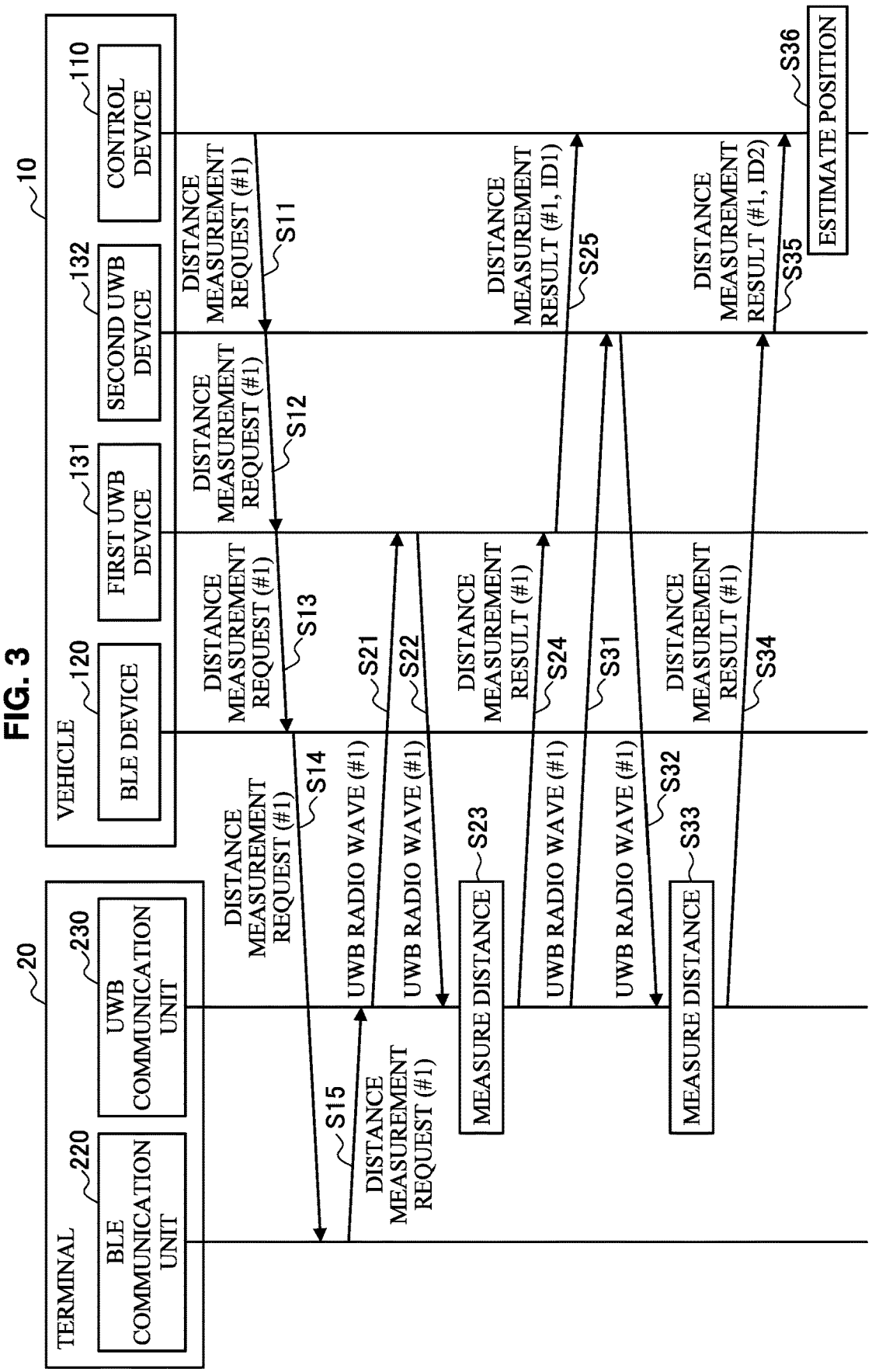

CONTROL DEVICE, STORAGE MEDIUM, AND COMMUNICATION SYSTEM

CROSS REFERENCE TO RELATED APPLICATION(S)

This application is based upon and claims benefit of priority from Japanese Patent Application No. 2021-019052, filed on Feb. 9, 2021, the entire contents of which are incorporated herein by reference.

BACKGROUND

The present invention relates to a control device, a storage medium, and a communication system.

Recently, there has been known the technology of detecting a position of a terminal used by a user. For example, there is known the technology of detecting a position of a terminal on the basis of distance measurement results between each of two communication devices provided in a vehicle and a terminal used by a user (see U.S. Pat. No. 9,566,945, for example). In such a technology, the operation of the vehicle is permitted when the detected position of the terminal satisfies a condition.

SUMMARY

However, it is demanded to improve the accuracy of processing in accordance with distance measurement results between each of at least two communication devices and a terminal.

In view of the above-described problem, the present invention aims at providing a new and improved technology capable of improving the accuracy of processing in accordance with distance measurement results between each of at least two communication devices and a terminal.

To solve the above-described problems, according to an aspect of the present invention, there is provided a control device including: an information acquisition unit configured to acquire first information associating a first distance measurement result between a terminal and a first communication device and first identification information of the first communication device, from the first communication device, and to acquire second information associating a second distance measurement result between the terminal and a second communication device and second identification information of the second communication device, from the second communication device.

In addition, to solve the above-described problems, according to another aspect of the present invention, there is provided a non-transitory computer readable storage medium storing a program. The program controlling a computer to function as a control device that includes: an information acquisition unit configured to acquire first information associating a first distance measurement result between a terminal and a first communication device and first identification information of the first communication device, from the first communication device, and to acquire second information associating a second distance measurement result between the terminal and a second communication device and second identification information of the second communication device, from the second communication device.

In addition, to solve the above-described problems, according to another aspect of the present invention, there is provided a communication system, including: a first communication device configured to output first information associating a first distance measurement result between a terminal and the first communication device and first identification information of the first communication device; a second communication device configured to output second information associating a second distance measurement result between the terminal and the second communication device and second identification information of the second communication device; and a control device configured to acquire the first information from the first communication device, and to acquire the second information from the second communication device.

As described above, the present invention provides a technology capable of improving the accuracy of processing in accordance with distance measurement results between each of at least two communication devices and a terminal.

BRIEF DESCRIPTION OF THE DRAWINGS

FIG. 3 is a sequence diagram illustrating an operation example of a communication system according to the embodiment of the invention.

DETAILED DESCRIPTION OF THE EMBODIMENT(S)

Figure 1:
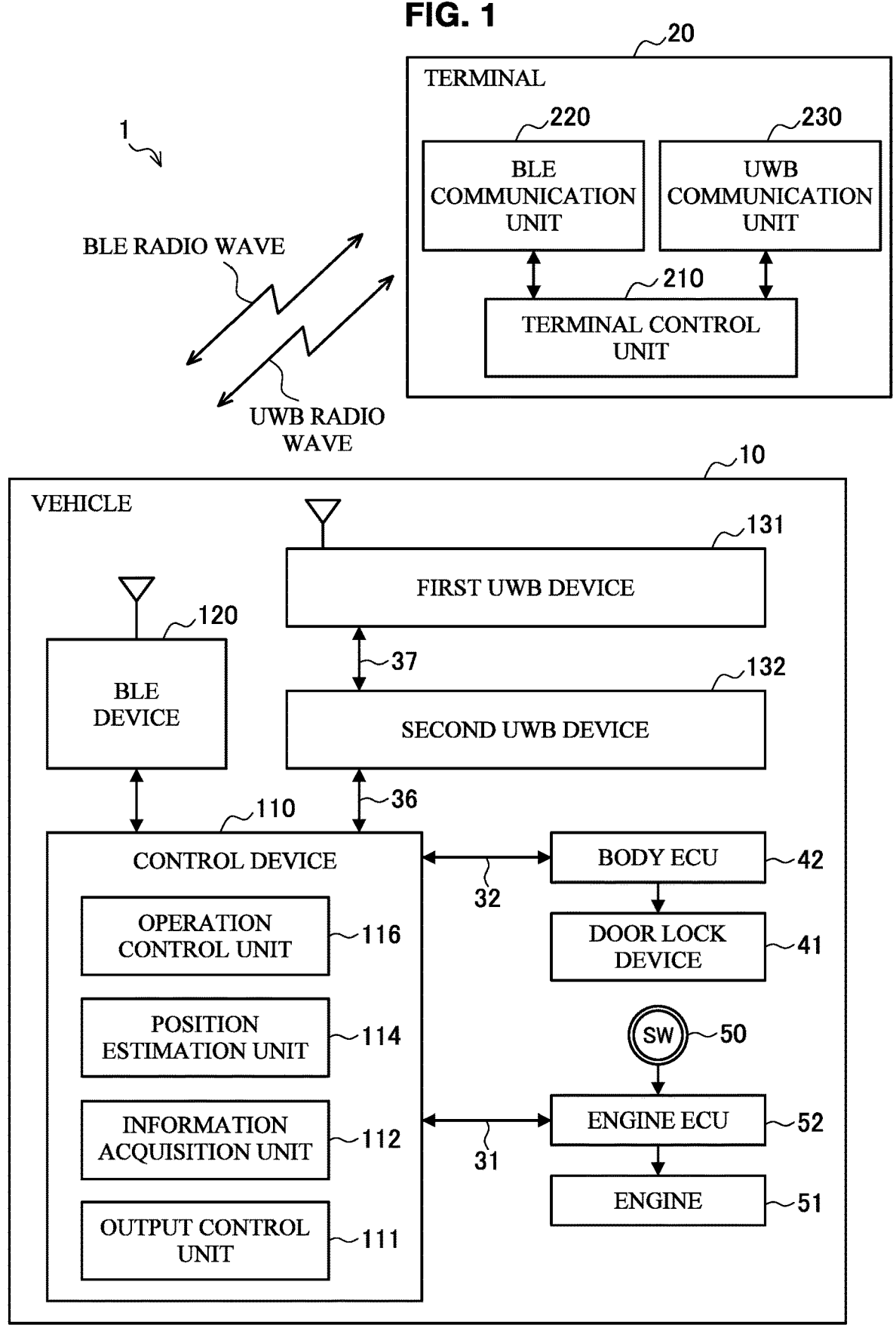
FIG. 1 is a diagram illustrating a configuration example of a communication system according to an embodiment of the invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

The following will describe a communication system according to an embodiment of the invention.

1.1. Configuration Example

First, a configuration example of a communication system according to an embodiment of the invention will be described with reference to FIG. 1.

FIG. 1 is a diagram illustrating a configuration example of a communication system according to an embodiment of the invention. As illustrated in FIG. 1, the communication system according to an embodiment of the invention includes a vehicle 10 and a terminal 20. Note that in the embodiment of the invention, it is mainly assumed that the terminal 20 is an electronic key. However, the terminal 20 is not limited to an electronic key. For example, the terminal 20 may be a terminal other than an electronic key, such as a smartphone, a tablet terminal, a cellular phone, or other electronic apparatuses.

Configuration of Vehicle

The following will describe a configuration of the vehicle 10. As illustrated in FIG. 1, the vehicle 10 includes a door lock device 41 as an example of an on-vehicle device, a body electronic control unit (ECU) 42, an engine 51 as an example of an on-vehicle device, an engine ECU 52, a control device 110, a Bluetooth (registered trademark) low energy (BLE) device 120, a first ultra wide band (UWB) device 131, and a second UWB device 132.

The door lock device 41 controls the lock and unlock of a door of the vehicle 10. The body ECU 42 controls the power source of an on-vehicle electric component. For example, the body ECU 42 activates the door lock device 41 under the control of the control device 110. For example, the processor executes a program corresponding to the body ECU 42 stored in a recording medium (not illustrated), whereby the computer functions as the body ECU 42.

The engine 51 is an engine of the vehicle 10. The engine ECU 52 controls the engine 51. For example, the engine ECU 52 activates the engine 51 under the control of the control device 110. For example, the processor executes a program corresponding to the engine ECU 52 stored in a recording medium (not illustrated), whereby the computer functions as the engine ECU 52.

The control device 100 includes an output control unit 111, an information acquisition unit 112, a position estimation unit 114, and an operation control unit 116. The output control unit 111, the information acquisition unit 112, the position estimation unit 114, and the operation control unit 116 will be described later in detail. For example, the processor executes a program corresponding to the control device 110 stored in a recording medium (not illustrated), whereby the computer functions as the control device 110. As an example, the control device 110 may correspond to a collation ECU that controls the lock and unlock of a door.

The first UWB device 131 corresponds to an example of a first communication device that performs communication for acquiring a measured distance value (hereinafter, also referred to as "distance measurement communication") with the terminal 20. The first UWB device 131 is connected to the second UWB device 132 through a communication line 37. The second UWB device 132 corresponds to an example of a second communication device that performs distance measurement communication with the terminal 20. The second UWB device 132 is connected to the control device 110 through a communication line 36. The second UWB device 132 is able to function as a master communication device controlling the first UWB device 131. Meanwhile, the first UWB device 131 is able to function as a slave communication device controlled by the second UWB device 132.

The communication protocol for the communication through the communication line 36 and the communication line 37 may be, for example, a local interconnect network (LIN) or a controller area network (CAN). Note that a communication interface such as a universal asynchronous receiver transmitter (UART) may be used for the communication line 36.

The BLE device 120 performs communication based on the BLE standard with the terminal 20. Note that the BLE device 120 is an example of a communication device that performs communication with the terminal 20 by transmitting and receiving radio waves to and from the terminal 20. Therefore, a communication device other than the BLE device 120 may be used instead of the BLE device 120. For example, instead of the BLE device 120, there may be used a communication device that performs communication based on the near field communication (NFC) standard.

The control device 110 and the body ECU 42 are connected through a communication line 32 in the vehicle 10. The protocol used for the communication through the communication line 32 may be, for example, CAN or LIN. Moreover, the control device 110 and the engine ECU 52 are connected through a communication line 31 in the vehicle 10. The protocol used for the communication through the communication line 31 may be, for example, CAN or LIN.

Configuration of Terminal

Next, the configuration of the terminal 20 will be described. The terminal 20 includes a terminal control unit 210, a BLE communication unit 220, and a UWB communication unit 230.

The terminal control unit 210 controls the operations of the terminal 20. For example, the processor executes a program corresponding to the terminal control unit 210 stored in a recording medium (not illustrated), whereby the computer functions as the terminal control unit 210. As an example, the terminal control unit 210 controls communication by the BLE communication unit 220 and communication by the UWB communication unit 230.

The BLE communication unit 220 performs communication based on the BLE standard with the vehicle 10. Note that the BLE communication unit 220 is an example of a communication device that performs communication with the vehicle 10 by transmitting and receiving radio waves to and from the vehicle 10. Therefore, a communication unit other than the BLE communication unit 220 may be used instead of the BLE communication unit 220. For example, instead of the BLE communication unit 220, there may be used another communication unit that adopts a communication system in accordance with the change of the communication system of the communication device in the vehicle 10.

The UWB communication unit 230 performs distance measurement communication with each of the first UWB device 131 and the second UWB device 132.

Distance Measurement Communication

The following will describe distance measurement communication.

Note that in the following description, it is mainly assumed that a measured distance value between the vehicle 10 and the terminal 20 is calculated on the basis of radio wave propagation time between the vehicle 10 and the terminal 20 so as to calculate the measured distance value with higher accuracy. However, the measured distance value may be calculated on the basis of a value other than the radio wave propagation time. For example, the measured distance value may be calculated on the basis of the strength (received signal strength indicator (RSSI)) of radio waves transmitted from one of the vehicle 10 and the terminal 20 and received by the other. That is, in the following description, a measured distance value based on the radio propagation time may be replaced by a measured distance value based on the radio wave strength.

For example, when the BLE device 120 receives a signal transmitted from the BLE communication unit 220 (hereinafter, also referred to as a "trigger signal"), the output control unit 111 performs a control such that a distance measurement request is output, on the basis of the fact that the BLE device 120 has received the trigger signal. Note that the trigger signal will be described later.

When the control device 110 outputs the distance measurement request, the second UWB device 132 receives an input of the distance measurement request from the control device 110. Upon receiving the input of the distance measurement request, the second UWB device 132 outputs the distance measurement request to the first UWB device 131. When the second UWB device 132 outputs the distance measurement request, the first UWB device 131 receives an input of the distance measurement request from the second UWB device 132.

Furthermore, when the control device 110 outputs the distance measurement request, the BLE device 120 receives an input of the distance measurement request from the control device 110. Upon receiving the input of the distance measurement request, the BLE device 120 transmits the distance measurement request to the BLE communication unit 220 of the terminal 20. Upon receiving the distance measurement request, the BLE communication unit 220 outputs the distance measurement request to the UWB communication unit 230.

Upon receiving the input of the distance measurement request, the UWB communication unit 230 starts distance measurement communication with the vehicle 10. Note that in the embodiment of the invention, it is mainly assumed that radio waves used for distance measurement communication (radio waves for distance measurement and radio waves in response thereto) are radio waves in a UWB band. Thus, in the following, the radio waves used for distance measurement communication may be described as "UWB radio waves". However, the radio waves used for distance measurement communication are not limited to radio waves in a UWB band.

First, in distance measurement communication, the UWB communication unit 230 transmits UWB radio waves. In the vehicle 10, when UWB radio waves are received, the first UWB device 131 transmits UWB radio waves in response thereto. Then, the UWB communication unit 230 receives the UWB radio waves transmitted from the vehicle 10. Here, the terminal control unit 210 of the terminal 20 calculates a measured distance value on the basis of UWB radio wave propagation time between the first UWB device 131 and the UWB communication unit 230.

To be more specific, the terminal control unit 210 calculates, using a time of flight (TOF) system, propagation time from the transmission of UWB radio waves to the reception of UWB radio waves in response thereto, and acquires a distance measurement result between the first UWB device 131 and the terminal 20 (first distance measurement result) on the basis of this propagation time. In the same system, the terminal control unit 210 acquires a distance measurement result (second distance measurement result) between the second UWB device 132 and the terminal 20.

Note that in the embodiment of the invention, it is mainly assumed that the terminal 20 calculates propagation time and a measured distance value. However, each of the first UWB device 131 and the second UWB device 132 may calculate propagation time and a measured distance value. Each of the first UWB device 131 and the second UWB device 132 may transmit UWB radio waves to the terminal 20, and the UWB communication unit 230 of the terminal 20 may transmit UWB radio waves in response thereto to each of the first UWB device 131 and the second UWB device 132.

1.2. Comparative Example

Figure 2:
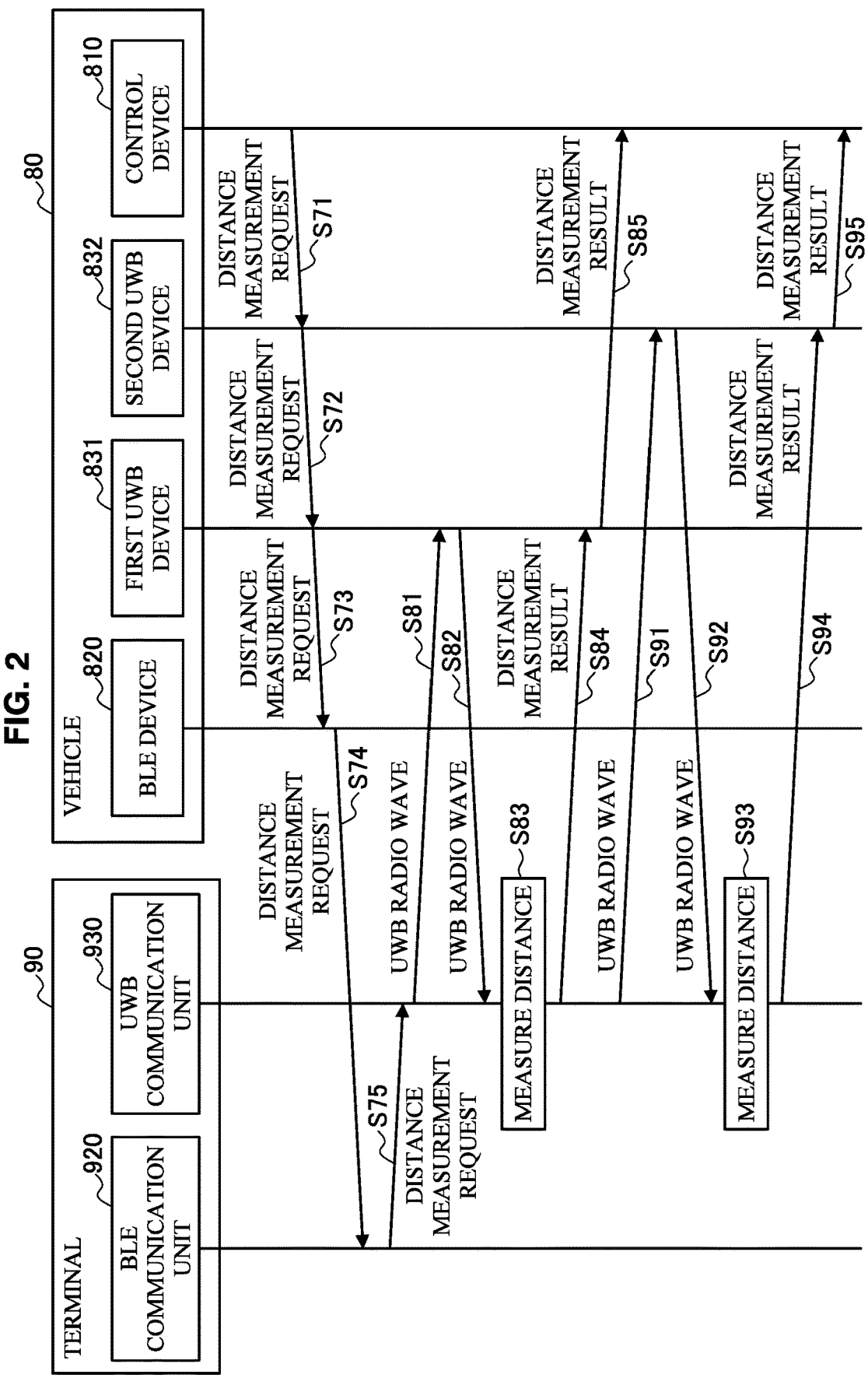
FIG. 2 is a sequence diagram illustrating an operation example of a communication system according to a comparative example.

The following will describe an operation example of a communication system according to a comparative example with reference to FIG. 2.

FIG. 2 is a sequence diagram illustrating an operation example of a communication system according to a comparative example. As illustrated in FIG. 2, the communication system according to the comparative example includes a terminal 90 and a vehicle 80. The terminal 90 includes a BLE communication unit 920 and a UWB communication unit 930. Meanwhile, the vehicle 80 includes a BLE device 820, a first UWB device 831, a second UWB device 832, and a control device 810.

First, when the BLE device 820 receives a trigger signal transmitted from the BLE communication unit 920, the control device 810 performs a control such that a distance measurement request is output, on the basis of the fact that the BLE device 820 has received the trigger signal (S71).

When the control device 810 outputs the distance measurement request, the second UWB device 832 receives an input of the distance measurement request from the control device 810. Upon receiving the input of the distance measurement request, the second UWB device 832 outputs the distance measurement request to the first UWB device 831 (S72). When the second UWB device 832 outputs the distance measurement request, the first UWB device 831 receives an input of the distance measurement request from the second UWB device 832.

Furthermore, when the control device 810 outputs the distance measurement request, the BLE device 820 receives an input of the distance measurement request from the control device 810 (S73). Upon receiving the input of the distance measurement request, the BLE device 820 transmits the distance measurement request to the BLE communication unit 920 of the terminal 90 (S74). Upon receiving the distance measurement request, the BLE communication unit 920 outputs the distance measurement request to the UWB communication unit 930 (S75).

Upon receiving the input of the distance measurement request, the UWB communication unit 930 starts distance measurement communication with the vehicle 80. First, the UWB communication unit 930 transmits UWB radio waves (S81). In the vehicle 80, when the UWB radio waves are received, the first UWB device 831 transmits UWB radio waves in response thereto (S82). Then, the UWB communication unit 930 receives the UWB radio waves transmitted from the vehicle 80. Here, the terminal 90 calculates a measured distance value on the basis of UWB radio wave propagation time between the first UWB device 831 and the UWB communication unit 930 (S83).

The UWB communication unit 930 transmits the distance measurement result between the first UWB device 831 and the UWB communication unit 930 to the first UWB device 831 (S84). The first UWB device 831 outputs the distance measurement result between the first UWB device 831 and the UWB communication unit 930 to the control device 810 through the second UWB device 832 (S85).

The UWB communication unit 930 transmits UWB radio waves again (S91). In the vehicle 80, when the UWB radio waves are received, the second UWB device 832 transmits UWB radio waves in response thereto (S92). Then, the UWB communication unit 930 receives the UWB radio waves transmitted from the vehicle 80. Here, the terminal 90 calculates a measured distance value on the basis of UWB radio wave propagation time between the second UWB device 832 and the UWB communication unit 930 (S93).

The UWB communication unit 930 transmits the distance measurement result between the second UWB device 832 and the UWB communication unit 930 to the second UWB device 832 (S94). The second UWB device 832 outputs the distance measurement result between the second UWB device 832 and the UWB communication unit 930 to the control device 810 (S95).

The control device 810 acquires the distance measurement result between the first UWB device 831 and the UWB communication unit 930 from the first UWB device 831 through the second UWB device 832. In addition, the control device 810 acquires the distance measurement result between the second UWB device 832 and the UWB communication unit 930 from the second UWB device 832. Then, the control device 810 performs processing in accordance with the distance measurement result between the first UWB device 831 and the UWB communication unit 930 and the distance measurement result between the second UWB device 832 and the UWB communication unit 930.

However, in this comparative example, the accuracy of processing in accordance with such distance measurement results is not improved.

The first reason why the accuracy of processing in accordance with distance measurement results is not improved is because the control device 810 does not necessarily acquire distance measurement results in the order of distance measurement requests. As an example, when the distance measurement result in response to the second distance measurement request is acquired (prior to the distance measurement result in response to the first distance measurement request) as the distance measurement result between the first UWB device 831 and the UWB communication unit 930 and the distance measurement result in response to the first distance measurement request is acquired as the distance measurement result between the second UWB device 832 and the UWB communication unit 930, the acquired two distance measurement results do not correspond temporally. This is considered to be a reason why the accuracy of processing in accordance with these distance measurement results is not improved.

The second reason why the accuracy of processing in accordance with distance measurement results is not improved is because it is difficult to discriminate whether the distance measurement result acquired by the control device 810 is a distance measurement result between the first UWB device 831 and the UWB communication unit 930 or a distance measurement result between the second UWB device 832 and the UWB communication unit 930. Particularly, when both distance measurement results are directly output from the second UWB device 832 to the control device 810, as described above, such discrimination is considered to be difficult.

Therefore, the embodiment of the invention proposes a technology of improving the accuracy of processing in accordance with distance measurement results by mainly solving these two problems.

1.3. Operation Example of Embodiment

The following will describe an operation example of the communication system 1 according to an embodiment of the invention with reference to FIG. 3.

FIG. 3 is a sequence diagram illustrating an operation example of the communication system according to the embodiment of the invention. First, when the BLE device 120 receives a trigger signal transmitted from the BLE communication unit 220, the output control unit 110 controls the BLE device 120 so that a distance measurement request is output, on the basis of the fact that the BLE device 120 has received the trigger signal.

To be more specific, in a case where the number of times of distance measurement requests output in the past is measured, the output control unit 111 adds counter information in accordance with the number of times of distance measurement requests output in the past, to a distance measurement request, and performs a control such that the distance measurement request with the counter information is output to the second UWB device 132 (S11). For example, the counter information "#1" indicates that the number of times of distance measurement requests output in the past is zero and the number of times of distance measurement requests with an output of this time is larger than zero by one, being the "first time".

Note that the kind of signal transmitted from the BLE communication unit 220 as a trigger signal is not limited. For example, the trigger signal may be a connection request signal transmitted from the terminal 20 in response to an advertising signal transmitted by the BLE device 120 on the basis of the BLE standard.

When the control device 110 outputs the distance measurement request with the counter information "#1", the second UWB device 132 receives an input of the distance measurement request with the counter information "#1" from the control device 110. Upon receiving the input of the distance measurement request with the counter information "#1", the second UWB device 132 outputs the distance measurement request with the counter information"#1" to the first UWB device 131 (S12). When the second UWB device 132 outputs the distance measurement request with the counter information "#1", the first UWB device 131 receives an input of the distance measurement request with the counter information "#1" from the second UWB device 132.

Furthermore, the output control unit 111 performs a control such that the distance measurement request with the counter information "#1" is output to the BLE device 120 (S13). When the control device 110 outputs the distance measurement request with the counter information "#1" to the BLE device 120, the BLE device 120 receives an input of the distance measurement request with the counter information "#1" from the control device 110 (S13). Upon receiving the input of the distance measurement request with the counter information "#1", the BLE device 120 outputs the distance measurement request with the counter information "#1" to the BLE communication unit 220 of the terminal 20 (S14). Upon receiving the distance measurement request with the counter information "#1", the BLE communication unit 220 outputs the distance measurement request with the counter information "#1" to the UWB communication unit 230 (S15).

Upon receiving the input of the distance measurement request with the counter information "#1", the UWB communication unit 230 starts distance measurement communication with the vehicle 10.

First, the UWB communication unit 230 transmits UWB radio waves with the counter information "#1" (S21). In the vehicle 10, when the UWB radio waves with the counter information "#1" are received, the first UWB device 131 transmits UWB radio waves with the counter information "#1" in response thereto (S22). Then, the UWB communication unit 230 receives the UWB radio waves with the counter information "#1" transmitted from the vehicle 10. Here, the terminal 20 calculates a measured distance value on the basis of propagation time of the UWB radio waves with the counter information "#1" (S23). In this manner, the distance measurement result between the terminal 20 and the first UWB device 131 (first distance measurement result) is acquired.

The UWB communication unit 230 transmits the distance measurement result between the terminal 20 and the first UWB device 131 with the counter information "#1" associated thereto, to the first UWB device 131 (S24). Upon receiving the distance measurement result between the terminal 20 and the first UWB device 131 with the counter information "#1" associated thereto, the first UWB device 131 associates the identification information of the first UWB device 131 (first identification information) to the distance measurement result between the terminal 20 and the first UWB device 131 with the counter information "#1" associated thereto. Note that as the identification information of the first UWB device 131, there may be used identification information (ID) given to the first UWB device 131 in a network (LIN, for example). In the following, the identification information of the first UWB device 131 will be also referred to as "ID1".

Then, the first UWB device 131 outputs the associated information (first information) including the distance measurement result between the terminal 20 and the first UWB device 131, the counter information "#1", and the identification information of the first UWB device 131 "ID1", to the control device 110 through the second UWB device 132 (S25).

The UWB communication unit 230 transmits UWB radio waves with the counter information "#1" again (S31). In the vehicle 10, when the UWB radio waves with the counter information "#1" are received, the second UWB device 132 transmits UWB radio waves with the counter information "#1" in response thereto (S32). Then, the UWB communication unit 230 receives the UWB radio waves with the counter information "#1" transmitted from the vehicle 10. Here, the terminal 20 calculates a measured distance value on the basis of propagation time of the UWB radio waves with the counter information "#1" (S33). In this manner, the distance measurement result between the terminal 20 and the second UWB device 132 (second distance measurement result) is acquired.

The UWB communication unit 230 transmits the distance measurement result between the terminal 20 and the second UWB device 132 with the counter information "#1" associated thereto, to the second UWB device 132 (S34). Upon receiving the distance measurement result between the terminal 20 and the second UWB device 132 with the counter information "#1" associated thereto, the second UWB device 132 associates the identification information of the second UWB device 132 (second identification information) to the distance measurement result between the terminal 20 and the second UWB device 132 with the counter information "#1" associated thereto. Note that as the identification information of the second UWB device 132, there may be used identification information (ID) given to the second UWB device 132 in a network (LIN, for example). In the following, the identification information of the second UWB device 132 will be also referred to as "ID2".

Then, the second UWB device 132 outputs the associated information (second information) including the distance measurement result between the terminal 20 and the second UWB device 132, the counter information "#1", and the identification information of the second UWB device 132 "ID2", to the control device 110 (S35).

In the control device 110, the information acquisition unit 112 acquires the associated information including the distance measurement result between the terminal 20 and the first UWB device 131, the counter information "#1", and the identification information of the first UWB device 131 "ID1", from the first UWB device 131 through the second UWB device 132. In addition, the information acquisition unit 112 acquires the associated information including the distance measurement result between the terminal 20 and the second UWB device 132, the counter information "#1", and the identification information of the second UWB device 132 "ID2", from the second UWB device 132.

Here, the position estimation unit 114 is able to recognize the distance measurement result associated to the identification information of the first UWB device 131 "ID1" as a distance measurement result between the terminal 20 and the first UWB device 131. Meanwhile, the position estimation unit 114 is able to recognize the distance measurement result associated to the identification information of the second UWB device 132 "ID2" as a distance measurement result between the terminal 20 and the second UWB device 132.

In this manner, the above-described "second reason why the accuracy of processing in accordance with distance measurement results is not improved" is solved (that is, it is possible to discriminate the distance measurement result between the terminal 20 and the first UWB device 131 and the distance measurement result between the terminal 20 and the second UWB device 132), thereby improving the accuracy of processing in accordance with the distance measurement result between the terminal 20 and the first UWB device 131 and the distance measurement result between the terminal 20 and the second UWB device 132.

As an example of the processing, the position estimation unit 114 estimates the position of the terminal 20 on the basis of the distance measurement result between the terminal 20 and the first UWB device 131 and the distance measurement result between the terminal 20 and the second UWB device 132 (S36).

Here, the position estimation unit 114 is able to determine whether the distance measurement result between the terminal 20 and the first UWB device 131 and the distance measurement result between the terminal 20 and the second UWB device 132 are associated to the same counter information (counter information "#1" in the example of FIG. 3). Then, when it is determined that the distance measurement result between the terminal 20 and the first UWB device 131 and the distance measurement result between the terminal 20 and the second UWB device 132 are associated to the same counter information, the position estimation unit 114 is able to estimate the position of the terminal 20 on the basis of the distance measurement result between the terminal 20 and the first UWB device 131 and the distance measurement result between the terminal 20 and the second UWB device 132.

In this manner, the "first reason why the accuracy of processing in accordance with the distance measurement results is not improved" is solved (that is, it is possible to secure the temporal correspondence relation of the distance measurement result between the terminal 20 and the first UWB device 131 and the distance measurement result between the terminal 20 and the second UWB device 132), thereby improving the accuracy of processing in accordance with the distance measurement result between the terminal 20 and the first UWB device 131 and the distance measurement result between the terminal 20 and the second UWB device 132.

The following will specifically describe an example of estimating the position of the terminal 20. That is, the position of the first UWB device 131 and the position of the second UWB device 132 are preliminarily registered in a recording medium (not illustrated) of the vehicle 10. The position estimation unit 114 acquires the position of the first UWB device 131 and the position of the second UWB device 132 from the recording medium (not illustrated) of the vehicle 10.

Then, the position estimation unit 114 calculates a position (hereinafter, also referred to as a "first candidate position") in accordance with the distance measurement result between the terminal 20 and the first UWB device 131 and the position of the first UWB device 131. For example, the first candidate position may be a circumference or a spherical surface having a measured distance value between the terminal 20 and the first UWB device 131 as a radius, with the position of the first UWB device 131 as a reference.

Similarly, the position estimation unit 114 calculates a position (hereinafter, also referred to as a "second candidate position") in accordance with the distance measurement result between the terminal 20 and the second UWB device 132 and the position of the second UWB device 132. For example, the second candidate position may be a circumference or a spherical surface having a measured distance value between the terminal 20 and the second UWB device 132 as a radius, with the position of the second UWB device 132 as a reference.

On the basis of the first candidate position and the second candidate position calculated in this manner, the position estimation unit 114 estimates the position of the terminal 20. For example, the position estimation unit 114 is able to estimate, as the position of the terminal 20, a position where the first candidate position and the second candidate position overlap each other. Note that the position estimation unit 114 may calculate the position of the terminal 20 in two-dimensional coordinates or three-dimensional coordinates. Alternatively, the position estimation unit 114 may estimate, as the position of the terminal 20, an area to which the two-dimensional coordinates or three-dimensional coordinates of the terminal 20 calculated in this manner belong.

The operation control unit 116 controls execution of processing in accordance with the position of the terminal 20 estimated by the position estimation unit 114. For example, the operation control unit 116 controls the operations of the vehicle 10 on the basis of the position of the terminal 20 estimated by the position estimation unit 114. In this manner, the operations of the vehicle 10 are controlled in accordance with the position of the terminal 20, which improves usability for users.

To be more specific, when it is determined that the position of the terminal 20 estimated by the position estimation unit 114 is outside the vehicle interior, the operation control unit 116 may permit the body ECU 42 to lock or unlock the door lock device 41. In this manner, when a touch operation is performed on the vehicle exterior door handle while the door is locked, for example, the vehicle door is unlocked. Meanwhile, when a pressing operation is performed on the lock button of the vehicle exterior door handle while the door is unlocked, the vehicle door is locked.

As another example, when it is determined that the position of the terminal 20 estimated by the position estimation unit 114 is inside the vehicle interior, the operation control unit 116 may permit the engine start of the vehicle 10. In this manner, when the engine switch 50 is operated while the brake pedal is stepped in, for example, the engine 51 is started. To be more specific, when it is determined that the position of the terminal 20 estimated by the position estimation unit 114 is inside the vehicle interior, the operation control unit 116 may permit the engine switch 50 in the vehicle interior to switch the power state of the vehicle.

Note that the target of the operation control by the operation control unit 116 is not limited to machinery or devices of the vehicle 10. The operation control unit 116 may control the operations of machinery or devices other than the vehicle 10 on the basis of the position of the terminal 20 estimated by the position estimation unit 114.

1.4. Effect

In the above-described embodiment, there is provided the control device 110 including the information acquisition unit 112 that acquires the associated information including the distance measurement result between the terminal 20 and the first UWB device 131 and the first identification information of the first UWB device 131 "ID1" from the first UWB device 131, and acquires the associated information including the distance measurement result between the terminal 20 and the second UWB device 132 and the second identification information of the second UWB device 132 "ID2" from the second UWB device 132.

In this configuration, it is possible to discriminate the distance measurement result between the terminal 20 and the first UWB device 131 and the distance measurement result between the terminal 20 and the second UWB device 132. Therefore, in this configuration, it is possible to improve the accuracy of processing in accordance with the distance measurement result between the terminal 20 and the first UWB device 131 and the distance measurement result between the terminal 20 and the second UWB device 132.

Furthermore, in the above-described embodiment, the control device 110 includes the output control unit 111 that performs a control such that a distance measurement request with counter information in accordance with the number of times of distance measurement requests output in the past is output.

Then, the information acquisition unit 112 acquires, from the first UWB device 131, the associated information including the distance measurement result between the terminal 20 and the first UWB device 131, the first identification information "ID1", and the counter information "#1" added to a distance measurement request, which is obtained on the basis of the fact that the distance measurement request has been input. Furthermore, the information acquisition unit 112 acquires, from the second UWB device 132, the associated information including the distance measurement result between the terminal 20 and the second UWB device 132, the second identification information "ID2", and the counter information "#1" added to a distance measurement request, which is obtained on the basis of the fact that the distance measurement request has been input.

In this configuration, it is possible to secure the temporal correspondence relation of the distance measurement result between the terminal 20 and the first UWB device 131 and the distance measurement result between the terminal 20 and the second UWB device 132. Therefore, in this configuration, it is possible to improve the accuracy of processing in accordance with the distance measurement result between the terminal 20 and the first UWB device 131 and the distance measurement result between the terminal 20 and the second UWB device 132.

1.5. Modification

Heretofore, preferred embodiments of the present invention have been described in detail with reference to the appended drawings, but the present invention is not limited thereto. It is obvious that a person skilled in the art can arrive at various alterations and modifications within the scope of the technical ideas defined in the claims, and it should be naturally understood that such alterations and modifications are also encompassed by the technical scope of the present invention.

Modification Related to Trigger Signal for Starting Distance Measurement

For example, the above description has exemplified, as a trigger signal for starting distance measurement, a connection request signal transmitted from the terminal 20 in response to an advertising signal transmitted by the BLE device 120. However, the kind of signal used as a trigger signal is not limited thereto. For example, the trigger signal may be an acknowledgment (ACK) signal transmitted from the terminal 20 in response to a wake signal.

In this case, in the vehicle 10, a low frequency (LF) transmitter (not illustrated) LF-transmits a wake signal, for example. In the terminal 20, when an LF reception unit (not illustrated) receives the wake signal, the terminal control unit 210 activates an ultra high frequency (UHF) transmission unit (not illustrated) from the stand-by state to UHF-transmit an ACK signal. In the vehicle 10, when an UHF receiver (not illustrated) receives the ACK signal in response to the wake signal, from the terminal 20, the output control unit 111 controls an output of a distance measurement request.

Alternatively, the trigger signal may be a signal indicating that an operation on the doorknob of the vehicle door has been performed, or a signal indicating that an operation on the engine switch 50 has been performed.

Modification Related to Operation Permission

The above has mainly described the case where the operation control unit 116 controls the operations of the vehicle 10 on the basis of the position of the terminal 20 estimated by the position estimation unit 114. Particularly, the above has described the case where the lock or unlock of the door of the vehicle 10 is permitted when it is determined that the position of the terminal 20 is outside the vehicle interior, and the case where the engine start of the vehicle 10 is permitted when it is determined that the position of the terminal 20 is inside the vehicle interior. However, the target of the operation permission is not limited thereto.

As an example, there is known the technology (remote parking) of allowing a user to move or stop the vehicle 10 by operating the terminal 20 at a place remote from the vehicle 10. When the remote parking is used, collision between the user and the vehicle 10 may occur unintentionally unless the movement of the vehicle 10 is permitted after the user is separate from the vehicle 10 to some extent. Therefore, the operation control unit 116 may permit the movement of the vehicle 10 when it is determined that the position of the terminal 20 estimated by the position estimation unit 114 is within an area farther than a given distance from the vehicle 10.

To be more specific, it is assumed that the vehicle 10 is provided with various actuators (parking actuators) that control operations of parking from the start to the stop of the engine on the basis of remote operation signals transmitted from the terminal 20. Here, when it is determined that the position of the terminal 20 is within an area farther than a given distance from the vehicle 10, the operation control unit 116 may permit parking actuators to perform a control of automatic operation of the steering, automatic travelling, or parking and stopping on the basis of remote operation signals transmitted from the terminal 20.

Modification Regarding UWB Device

In the above description, it is mainly assumed that two UWB devices perform distance measurement communication with the terminal 20. However, three or more UWB devices may perform distance measurement communication with the terminal 20. In such a case, with the UWB devices that perform distance measurement communication with the terminal 20, it is possible to estimate the position of the terminal 20 on the basis of the distance measurement results between the terminal 20 and each of three or more UWB devices, thereby estimating the position of the terminal 20 with higher accuracy. Note that as an example, one of three or more UWB devices may function as a master communication device and the rest may function as slave communication devices.

What is claimed is:

1. A control device, comprising:
an information acquisition unit configured to acquire first information associating a first distance measurement result between a terminal and a first communication device and first identification information of the first communication device, from the first communication device, and to acquire second information associating a second distance measurement result between the terminal and a second communication device and second identification information of the second communication device, from the second communication device,
wherein the information acquisition unit is further configured to acquire the first information from the first communication device through the second communication device, and acquire the second information from the second communication device.

2. The control device according to claim 1, further comprising:
a position estimation unit configured to estimate a position of the terminal on the basis of a position in accordance with a position of the first communication device and the first distance measurement result and a position in accordance with a position of the second communication device and the second distance measurement result.

3. The control device according to claim 1, further comprising:
an output control unit configured to perform a control such that a distance measurement request with counter information in accordance with the number of times of distance measurement requests output in a past is output, wherein
the information acquisition unit acquires, from the first communication device, the first information associating the first distance measurement result, the first identification information, and the counter information added to the distance measurement request, the first information being obtained on the basis of a fact that the distance measurement request is input.

4. The control device according to claim 3, wherein the information acquisition unit acquires, from the second communication device, the second information associating the second distance measurement result, the second identification information, and the counter information added to the distance measurement request, the second information being obtained on the basis of a fact that the distance measurement request is input.

5. The control device according to claim 4, further comprising:
a position estimation unit configured to estimate a position of the terminal on the basis of a position in accordance with a position of the first communication device and the first distance measurement result and a position in accordance with a position of the second communication device and the second distance measurement result, when it is determined that the first distance measurement result and the second distance measurement result are associated to same counter information.

6. The control device according to claim 3, wherein the output control unit performs a controls such that the distance measurement request with counter information is output, on the basis of a fact that a signal transmitted from the terminal is received.

7. The control device according to claim 6, wherein the signal is a connection request signal transmitted from the terminal in response to an advertising signal transmitted on the basis of a BLE standard.

8. The control device according to claim 6, wherein the signal is an ACK signal transmitted from the terminal in response to a wake signal.

9. The control device according to claim 1, wherein the first communication device and the second communication device are connected in series.

10. The control device according to claim 9, wherein the second communication device is connected to the information acquisition unit and the first communication device is connected to the second communication device.

11. The control device according to claim 1, wherein the first communication device and the second communication device are configured to process same communication signal type.

12. A non-transitory computer readable storage medium storing a program, the program controlling a computer to function as a control device that includes:
an information acquisition unit configured to acquire first information associating a first distance measurement result between a terminal and a first communication device and first identification information of the first communication device, from the first communication device, and to acquire second information associating a second distance measurement result between the terminal and a second communication device and second identification information of the second communication device, from the second communication device,
wherein the information acquisition unit is further configured to acquire the first information from the first communication device through the second communication device, and acquire the second information from the second communication device.

13. A communication system, comprising:
a first communication device configured to output first information associating a first distance measurement result between a terminal and the first communication device and first identification information of the first communication device;
a second communication device configured to output second information associating a second distance measurement result between the terminal and the second communication device and second identification information of the second communication device; and
a control device configured to acquire the first information from the first communication device through the second communication device, and to acquire the second information from the second communication device.

* * * * *